US010031292B2

(12) United States Patent
Chen

(10) Patent No.: US 10,031,292 B2
(45) Date of Patent: Jul. 24, 2018

(54) HORIZONTAL COUPLING TO SILICON WAVEGUIDES

(71) Applicant: Acacia Communications, Inc., Maynard, MA (US)

(72) Inventor: Long Chen, Marlboro, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/991,311

(22) Filed: Jan. 8, 2016

(65) Prior Publication Data

US 2016/0202421 A1 Jul. 14, 2016

Related U.S. Application Data

(60) Provisional application No. 62/101,046, filed on Jan. 8, 2015.

(51) Int. Cl.
| | | |
|---|---|---|
| *G02B 6/12* | (2006.01) | |
| *G02B 6/14* | (2006.01) | |
| *G02B 6/30* | (2006.01) | |
| *G02B 6/122* | (2006.01) | |
| *G02B 6/136* | (2006.01) | |

(52) U.S. Cl.
CPC ......... *G02B 6/305* (2013.01); *G02B 6/12002* (2013.01); *G02B 6/1228* (2013.01); *G02B 6/136* (2013.01); *G02B 6/14* (2013.01); *G02B 2006/121* (2013.01); *G02B 2006/12061* (2013.01); *G02B 2006/12152* (2013.01); *G02B 2006/12195* (2013.01)

(58) Field of Classification Search
CPC .............................. G02B 6/1228; G02B 6/305
See application file for complete search history.

(56) References Cited

U.S. PATENT DOCUMENTS

| | | | |
|---|---|---|---|
| 6,866,426 B1 | 3/2005 | Steinberg et al. | |
| 8,791,405 B2 * | 7/2014 | Ji | G02B 6/122 250/227.11 |

(Continued)

FOREIGN PATENT DOCUMENTS

| | | | | |
|---|---|---|---|---|
| EP | 1 400 822 A2 | 3/2004 | | |
| EP | 3 091 380 A1 * | 11/2016 | ............. | G02B 6/305 |

(Continued)

OTHER PUBLICATIONS

International Search Report and Written Opinion dated Mar. 23, 2016 for Application No. PCT/US2016/012657.

(Continued)

*Primary Examiner* — Michelle R Connelly
(74) *Attorney, Agent, or Firm* — Wolf, Greenfield & Sacks, P.C.

(57) ABSTRACT

Techniques for forming a facet optical coupler that includes a waveguide formed over a trench of a silicon substrate are described. The trench is formed in a silicon substrate and then filled with a dielectric material. The waveguide is patterned on the dielectric material over the trench such that the waveguide is disposed a distance from the first surface. A first end of the waveguide has a first size and a second end of the waveguide distal the first end has a second size different than the first size. A material of the waveguide and the first size define a mode size of the waveguide.

23 Claims, 2 Drawing Sheets

(56) References Cited

U.S. PATENT DOCUMENTS

| | | | |
|---|---|---|---|
| 8,815,704 B2* | 8/2014 | Meade | G02B 6/136 257/506 |
| 9,523,816 B2* | 12/2016 | Nakagawa | G02B 6/122 |
| 9,568,674 B2* | 2/2017 | Sandhu | G02B 6/136 |
| 9,618,699 B2* | 4/2017 | Tummidi | G02B 6/30 |
| 2004/0042729 A1 | 3/2004 | Zhou et al. | |
| 2004/0057667 A1 | 3/2004 | Yamada et al. | |
| 2009/0022457 A1 | 1/2009 | de Jong et al. | |
| 2009/0274418 A1* | 11/2009 | Holzwarth | B82Y 20/00 385/30 |
| 2009/0297093 A1 | 12/2009 | Webster et al. | |
| 2010/0040327 A1* | 2/2010 | Deki | G02B 6/305 385/28 |
| 2011/0116741 A1* | 5/2011 | Cevini | G02B 6/305 385/28 |
| 2011/0133063 A1 | 6/2011 | Ji et al. | |
| 2013/0015546 A1* | 1/2013 | Joe | G02B 6/122 257/432 |
| 2013/0322811 A1* | 12/2013 | Meade | H01L 21/76283 385/14 |
| 2013/0322813 A1* | 12/2013 | Grondin | B82Y 20/00 385/14 |
| 2013/0336346 A1* | 12/2013 | Kobrinsky | H01L 31/16 372/26 |
| 2014/0294341 A1* | 10/2014 | Hatori | G02B 6/12 385/14 |
| 2015/0063747 A1 | 3/2015 | Chen et al. | |
| 2015/0316719 A1* | 11/2015 | Nakagawa | G02B 6/122 216/24 |
| 2015/0346431 A1* | 12/2015 | Budd | G02B 6/12 385/14 |
| 2017/0052318 A1* | 2/2017 | Hofrichter | G02B 6/132 |

FOREIGN PATENT DOCUMENTS

| | | |
|---|---|---|
| JP | 53-010445 A | 1/1978 |
| WO | WO 02/079831 A1 | 10/2002 |
| WO | WO 2009/134691 A1 | 11/2009 |

OTHER PUBLICATIONS

Chen et al., Low-Loss and Broadband Cantilever Couplers Between Standard Cleaved Fibers and High-Index-Contrast $Si_3 N_4$ or Si Waveguides. IEEE Photon Tech Lett. Dec. 1, 2010;22(23):1744-6.

International Preliminary Report on Patentability dated Jul. 20, 2017 in connection with International Application No. PCT/US2016/012657.

Singaporean Search Report and Written Opinion dated May 24, 2018 in connection with Singaporean Application No. 11201705526R.

* cited by examiner

HORIZONTAL COUPLING TO SILICON WAVEGUIDES

RELATED APPLICATIONS

The present application claims the benefit under 35 U.S.C. § 119(e) of U.S. Provisional Patent Application Ser. No. 62/101,046 entitled "HORIZONTAL COUPLING TO SILICON WAVEGUIDES," filed Jan. 8, 2015, which is hereby incorporated herein by reference in its entirety.

BACKGROUND

Field

The present application relates to a horizontal coupling to a silicon waveguide via a facet optical coupler and related apparatus and methods.

Related Art

A photonic integrated circuit includes optical components integrated on a substrate. A facet optical coupler can couple an external optical component, such as an optical fiber, to a waveguide of a photonic integrated circuit via an edge of the substrate.

BRIEF SUMMARY

According to an aspect of the application, a method of forming a waveguide is provided, comprising forming a trench in a silicon substrate, wherein the trench has a first surface, filling the trench with a dielectric material, and patterning the waveguide on the dielectric material over the trench such that the waveguide is disposed at a distance L from the first surface. A first end of the waveguide terminating over the trench has, in some embodiments, a first size and a second end of the waveguide distal the first end has a second size different than the first size. In some embodiments, a material of the waveguide and the first size define a mode size of the waveguide smaller than 2L.

According to an aspect of the present application, an apparatus is provided, comprising a silicon substrate having a trench formed therein proximate a facet of the silicon substrate, wherein the trench has a first surface. The apparatus further comprises a dielectric material filling the trench, and a waveguide formed on the dielectric material and disposed at a distance L from the first surface. In some embodiments, a first end of the waveguide proximate the facet of the semiconductor chip has a first size and a second end of the waveguide distal the first end has a second size different than the first size. In some embodiments, a material of the waveguide and the first size define a mode size of the waveguide smaller than 2L.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
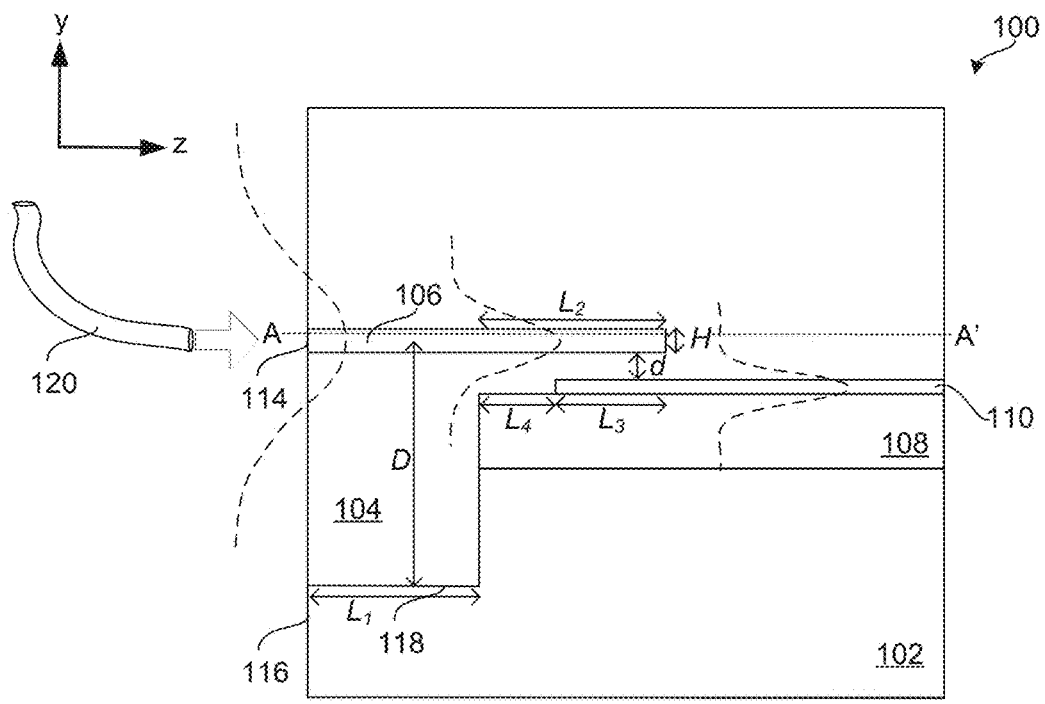
FIG. 1 is a cross-sectional diagram of a facet coupler having a waveguide positioned over a dielectric-filled trench in a silicon substrate, according to a non-limiting embodiment.

Aspects of the present application relate to a facet optical coupler of a silicon-based integrated optical device, such as a photonic integrated circuit (PIC). PICs can include optical components such as optical waveguides, some of which may have submicron dimensions. Coupling an optical fiber to a submicron waveguide on a semiconductor chip can be challenging due to the mismatch in mode field size between the optical fiber and the waveguide. For example, a standard single-mode optical fiber has a mode field diameter (MFD) of approximately 10 microns, while a silicon submicron waveguide may have a mode field diameter of less than 1 micron.

Aspects of the present application provide structures suitable for accommodating mode field size differences of the type described above, while providing low overlap of an optical signal from an optical fiber with a substrate supporting an integrated waveguide. Moreover, aspects of the present application provide robust fabrication sequences for making such structures. In at least some aspects of the present application, a substrate supporting an integrated waveguide configured to couple to an external optical fiber has a trench formed therein and filled with a dielectric material. The waveguide may be disposed on top of the dielectric and separated from the bottom of the trench in the substrate by a distance which, in light of the index of refraction of the waveguide, may be sufficient to prevent significant overlap of a mode field of the optical fiber with the substrate. In at least some embodiments, the structure may be configured such that the trench may be filled prior to formation of the waveguide, thereby simplifying manufacturing and providing improved mechanical strength compared to if the trench was filled after formation of the waveguide. In at least some embodiments, the substrate is a silicon substrate.

The silicon substrate may reduce coupling efficiency between the optical fiber and the integrated waveguide if positioned too close to the waveguide such that the silicon substrate overlaps with a portion of the mode of incident light from an optical fiber or other external optical component. Thus, it may be, and in some embodiments is, beneficial to use a distance between the silicon substrate and the waveguide which allows a facet optical coupler to accommodate larger optical mode field diameters and lead to improved horizontal coupling efficiency. Forming a trench in the substrate under the waveguide is one technique for providing an increased distance between the substrate and the waveguide. However, forming the trench after forming the waveguide, for instance by creating an undercut region, may lead to defects during wafer dicing and/or optical packaging of the resulting integrated optical device. Also, during attachment of an optical fiber, the undercut region, which may be difficult to fill and therefore which may contain air at the end of the fabrication and/or packaging process, may become at least partially filled (intentionally or inadvertently) with epoxy used to attach an optical fiber at the edge. The epoxy may not completely fill the undercut region, which can negatively impact optical properties of the PIC. Whether completely filling the undercut region or not, the epoxy may expand when heated (e.g., greater than 250° C., such as during solder reflow packaging processes) and may cause cracking or misalignment of the overlying waveguide. Accordingly, aspects of the present application relate to a facet optical coupler that simplifies the fabrication process of semiconductor photonic chips by forming and filling a trench in a silicon substrate before forming a waveguide over the trench to improve the ability of the facet optical coupler to couple with an optical fiber. The distance between a surface of the trench and the waveguide may be approximately half the optical mode field size of the waveguide to reduce the impact of the silicon substrate from interfering with propagation of light along the waveguide and creating optical loss due to leakage through the silicon substrate. Since the trench provides a vertical separation between the waveguide and the silicon substrate, the formation of the trench may allow the waveguide to support a vertical optical mode field size with reduced optical leakage to the silicon substrate. Accordingly, in some embodiments, the trench may be approximately half the vertical optical mode field size of the waveguide. Forming the waveguide after the trench of the silicon substrate may ease fabrication of such facet optical coupler structures and attachment of optical fibers to the facet optical couplers because such a method can be implemented at different stages of fabrication and processing of the integrated device.

Moreover, aspects of the present application relate to techniques for controlling one or more dimensions of an optical mode field of a waveguide on a silicon-based integrated device. A waveguide of a facet optical coupler on an integrated device configured to couple with an external optical fiber may have an optical mode field size suitable to couple with the mode field of the optical fiber. Other waveguides that make up a PIC on the integrated device may have smaller mode field sizes than that of the waveguide used to couple with the optical fiber. This difference between optical mode field sizes between the coupling waveguide and another waveguide configured to receive the signal from the optical fiber via the coupling waveguide on the integrated device may reduce the optical properties of the PIC.

Applicants have appreciated that incorporating techniques that vary the optical mode field size of a waveguide of a facet optical coupler may provide a desired level of coupling with one or more additional waveguides of the integrated device. The waveguide of a facet optical coupler, which may be referred to as a "coupling waveguide" may couple both to an optical fiber and a primary waveguide of the PIC on the integrated device. The coupling waveguide may vary in one or more dimensions along its length to expand or reduce the optical mode field size of light propagating along the coupling waveguide. The coupling waveguide may have a first end with a first size proximate an edge or facet of the semiconductor chip and a second end with a second size different than the first size. The first size of the coupling waveguide may allow coupling with an optical fiber at a desired level of coupling efficiency. The second size may provide a suitable optical mode field size for coupling with one or more additional primary waveguides of the semiconductor chip. Varying the optical mode field size of a waveguide may be combined with the formation of a trench in the silicon substrate to improve the coupling efficiency with an optical fiber. Accordingly, aspects of the present application relate to a waveguide of a facet optical coupler positioned over a trench of a silicon substrate filled with a material and sized to have an end terminating over the trench with a different size than a distal end of the waveguide. In some embodiments, the coupling waveguide may have a spot-size converter over the trench to gradually reduce the mode field size as the coupling waveguide approaches the trench boundary.

The aspects and embodiments described above, as well as additional aspects and embodiments, are described further below. These aspects and/or embodiments may be used individually, all together, or in any combination of two or more, as the application is not limited in this respect.

An exemplary facet optical coupler having a waveguide formed over a trench is shown in FIG. 1. The facet optical coupler is configured to couple light between optical fiber 120 positioned proximate to facet 114 into coupling waveguide 106. As an example, the arrow and dashed curved lines shown in FIG. 1 indicate the propagation of light through the facet optical coupler 100 from optical fiber 120 near facet 114 into primary waveguide 110 along the z-direction, where the curved dashed lines indicates a mode field size. It should be appreciated that an optical mode field can have any suitable shape (e.g., circular, elliptical). The shape of an optical mode field may have multiple mode sizes within a plane perpendicular to the direction of light propagation. For instance, an elliptical mode field may have both a horizontal mode field size and a vertical mode field size of different values that correspond to the major and minor axes of the elliptical shape. As shown in FIG. 1, the breadth of the dashed lines shows variation in the mode field size in the y-direction as light propagates through coupling waveguide 106 and primary waveguide 110. The phrase "vertical field mode size" may refer to the size of the mode field in the y-direction shown in FIG. 1. The term "horizontal field mode size" may refer to the size of the mode field in a direction in and out of the plan shown in FIG. 1.

An optical mode field size of a waveguide may depend on the material of the waveguide and/or one or more sizes of the waveguide. Varying the size and shape of the waveguide can alter the size of the optical mode field. The size of coupling waveguide 106 in a direction perpendicular to the propagation of light may define a mode size of coupling waveguide 106. The material of coupling waveguide 106 and a size of coupling waveguide may define a vertical mode field size of coupling waveguide 106.

Primary waveguide 110 may include silicon and may be considered a silicon waveguide. Facet optical coupler 100 may be used as an optical input or an optical output by changing the direction of light propagation. Although FIG. 1 shows the propagation of input light, facet optical coupler 100 may be configured as an optical output where light propagates through primary waveguide 110 and coupling waveguide 106 to couple with optical fiber 120 or other external optical component positioned proximate facet 114.

Facet optical coupler 100 includes silicon substrate 102 having edge 116. The edge 116 may represent a dicing interface of a larger wafer, meaning that the facet optical couple 100 may be diced from a wafer including a number of like devices. A trench of silicon substrate 102 is positioned proximate edge 116. The trench has surface 118 positioned a distance D from coupling waveguide 106 along the y-direction shown in FIG. 1. The presence of the silicon substrate within the optical mode field of a waveguide may affect the efficiency of coupling light into the waveguide and/or propagation of light along the waveguide. The formation of the trench at a distance D from coupling waveguide 106 may allow coupling waveguide 106 to accommodate light having a large mode field size (e.g., 10 μm), such as light from optical fiber 120, with improved efficiency than if the trench was not present, by reducing overlap of the mode field size with the silicon substrate. In this manner, a mode field size of coupling waveguide 106 may depend on distance D. In some embodiments, the mode field size of coupling waveguide 106 may have a mode field size of approximately 2D or less than 2D. In some embodiments, distance D is more than approximately 1.5 µm such that 2D is more than approximately 3 µm. The distance D may be in the range of approximately 2 µm to 10 µm, or any value or range of values within that range. In some embodiments, distance D may be more than approximately 1 µm. In some embodiments, it is preferable to have a mode field size in a direction between coupling waveguide 106 and surface 118 of the trench be approximately 2D or less than 2D to reduce leakage of the optical signal through the silicon substrate. In this manner, the vertical field mode size of coupling waveguide 106 may be approximately 2D or smaller than 2D. It should be appreciated that other dimensions of the optical mode field may have a dimension of approximately or less than 2D as well. For example, the horizontal mode size may or may not satisfy this condition, such as in the case of a circular optical mode field.

In some embodiments, it is preferable to have a mode field size of coupling waveguide 106 be approximately or less than 2D proximate to the end of coupling waveguide 106 near facet 114. This may allow coupling at a desired efficiency level between coupling waveguide 106 with optical fiber 120 or another external optic. A size of coupling waveguide 106 at facet 114 and the material of coupling waveguide 106 may define a mode size of coupling waveguide to be smaller than 2D.

The distance D may have a dimension based on the mode field diameter of an optical fiber. For a Gaussian power density distribution in a single-mode optical fiber, the mode field diameter is that at which the power density is reduced to $1/e^2$ of the maximum power density. Distance D may be approximately half the mode field diameter of an optical fiber to reduce leakage loss through the silicon substrate. For example, an optical fiber may have a mode field diameter of 10 µm and distance D may be approximately 5 µm to provide suitable separation between silicon substrate 102 and coupling waveguide 106. Aspects of the present application are not limited to distance D being half of a mode size of the optical fiber because some leakage through the silicon substrate can be tolerated. In some embodiments, the optical mode field of coupling waveguide 106 overlaps with silicon substrate 102. The power distribution of an optical mode field may be such that some power, although relatively low, may overlap with the silicon substrate. In some embodiments, there is less than approximately 10% mode overlap with silicon substrate 102.

The trench may be filled with one or more dielectric materials (e.g., $SiO_2$). Formation of the trench may occur prior to formation of coupling waveguide 106. A portion of silicon substrate 102 may be removed, such as by etching, to form the trench. The trench may be filled with dielectric material 104. The dielectric material 104 may be planarized to form a surface for forming coupling waveguide 106 to overlap with the trench. The trench and coupling waveguide may be formed in one or more photonic integrated circuits at the wafer-level prior to dicing and the formation of facet 114 and edge 116. In such embodiments, the trench and coupling waveguide are formed at suitable locations on the wafer where dicing can occur to form facets of individual photonic integrated circuits. In some embodiments, the trench is positioned at edge 116 of silicon substrate 102 as shown in FIG. 1. In other embodiments, the trench is positioned at a distance from edge 116 of the silicon substrate.

In addition to positioning coupling waveguide 106 with respect to silicon substrate 102 at a position suitable to prevent significant overlap of a mode field size with the silicon substrate 102, coupling waveguide 106 may be dimensioned to reduce mode overlap with the silicon substrate. Coupling waveguide 106 may have an end that terminates over the trench that has a different size than a distal end. Coupling waveguide 106 may vary in one or more dimensions along the length (z-direction shown in FIG. 1) of the waveguide to provide variation in the optical mode field size of the coupling waveguide. Coupling waveguide 106 may have a region where the mode field size is expanded to couple with an optical fiber and a region where the mode field size is reduced, which may act to confine the optical mode to within a desired size. The trench of silicon substrate 102 may accommodate a region of coupling waveguide 106 where there is mode field expansion. The trench in the silicon substrate provides a distance between the silicon substrate and coupling waveguide 106, which can allow propagation at higher efficiency of a larger mode field than if the trench was not present. The trench of silicon substrate 102 has a length $L_1$ along the z-direction. The length $L_1$ of the trench may provide a region along coupling waveguide 106 to confine the optical mode field to a desired size such that the mode field size is reduced by the time light reaches the boundary of the trench. In this manner, light that has passed the boundary of the trench may have a mode field size with reduced optical leakage through silicon substrate 102. Length $L_1$ may be in the range of approximately 50 µm to 300 µm, or any value or range of values within that range. Length $L_2$ along the z-direction of coupling waveguide 106 does not overlap with the trench, and coupling waveguide 106 along length $L_2$ may have an optical mode field size that reduces leakage loss through the underlying silicon substrate. Coupling waveguide 106 that overlaps with length $L_1$ of the trench can be configured to have a larger optical mode field size than the region of coupling waveguide 106 of length $L_2$.

The mode field size of coupling waveguide 106 may depend on a dimension of coupling waveguide 106 in a direction perpendicular to the direction of propagation of light. The dimension may be narrower proximate to facet 114 to provide an expanded optical mode field than at a location along coupling waveguide 106 distal from facet 114. The dimension may be larger proximate to the distal end of coupling waveguide 106 to confine the optical mode field size to suitably couple with another waveguide. In this manner, coupling waveguide 106 may have an end that terminates over the trench that has a smaller size than a distal end. The variation in the dimension along coupling waveguide 106 may occur as a tapering of the dimension along the z-direction of coupling waveguide 106. The taper may have any suitable profile, including a linear profile or an exponential profile, as non-limiting examples. The length of the taper of coupling waveguide 106 along the z-direction may be in the range of approximately 20 µm and approximately 500 µm. The length of the taper may depend on the mode field sizes at either end of the taper to provide a tapering of the coupling waveguide in a manner that reduces optical loss.

Figure 2:
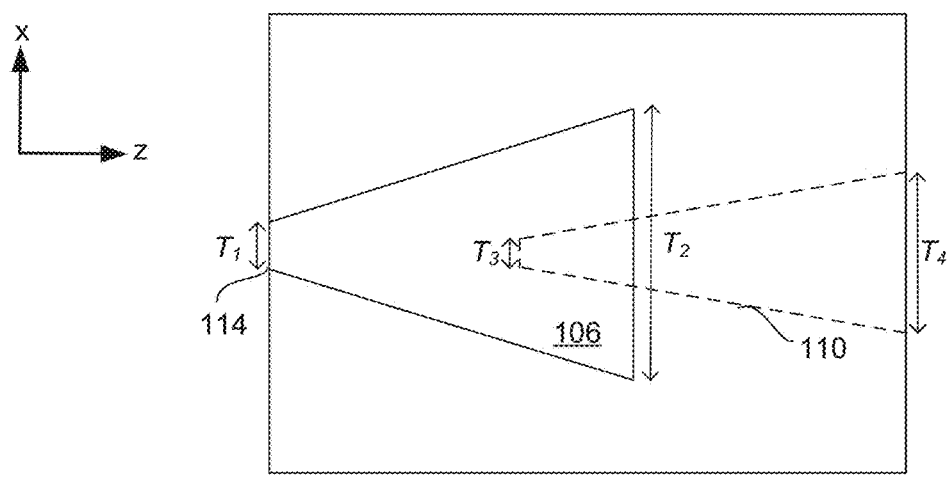
FIG. 2 is a planar view of the facet coupler of FIG. 1 taken along line A-A' in FIG. 1.

The dimension of coupling waveguide 106 that varies may be in a direction perpendicular to both the z and y directions shown in FIG. 1. An exemplary cross-sectional configuration of coupling waveguide 106 along line A-A' is shown in FIG. 2. Coupling waveguide 106 has a width $T_1$ at an end proximate to facet 114 and a width $T_2$ at an end distal to facet 114. As shown in FIG. 2, width $T_1$ is smaller than width $T_2$ to provide a larger optical mode field size at facet 114 than at the distal end. Width $T_1$ may be in the range of approximately 50 nm to approximately 1 µm, or any value or range of values within that range. Width $T_2$ may be in the range of approximately 500 nm to approximately 3 μm, or any value or range of values within that range. The optical properties of coupling waveguide 106 may depend on other factors besides the width of the waveguide structure. Such factors may include characteristics (e.g., refractive index) of the material that forms the coupling waveguide and material surrounding the coupling waveguide, the thickness H of coupling waveguide, the wavelength of the optical signal, and a mode size of the optical fiber or external optic. Although FIG. 2 shows an exemplary tapering of coupling waveguide 106 where the dimension along the x-direction at facet 114 is smaller than at the distal end of the coupling waveguide, some embodiments include a coupling waveguide where the width of the coupling waveguide is larger at the facet than at the distal end of the coupling waveguide.

The mode field size of coupling waveguide 106 may depend on the thickness H of coupling waveguide 106 along the y-direction shown in FIG. 1. The thickness H of coupling waveguide 106 may be in the range of approximately 100 nm to approximately 2 μm, or any value or range of values within that range. The thickness H of coupling waveguide 106 may depend on one or more materials of coupling waveguide 106. The thickness H of coupling waveguide 106 may be in the range of approximately 100 nm to approximately 400 nm, or any value or range of values within that range. In embodiments where coupling waveguide 106 is formed of silicon nitride (e.g., $Si_3N_4$), the thickness H of coupling waveguide 106 may be in the range of approximately 200 nm to approximately 400 nm. In embodiments where coupling waveguide 106 is formed of silicon, the thickness H of coupling waveguide 106 may be in the range of approximately 120 nm to approximately 220 nm. As shown in FIG. 1, thickness H can be substantially uniform along the length of coupling waveguide 106 in the z-direction. In some embodiments, thickness H may vary to provide variation in mode field size. For example, coupling waveguide 106 may have a smaller height at facet 114 than at a region distal to facet 114.

In embodiments where coupling waveguide 106 includes silicon nitride (e.g., $Si_3N_4$), coupling waveguide may have a thickness H in the range of 200 nm to 400 nm, a width $T_1$ in the range of 150 nm to 350 nm, and a width $T_2$ in the range of 500 nm to 1 μm. In such embodiments, the length $L_1$ of the surface of the trench in the range of 100 μm to 300 μm, and a length $L_3$ of overlap between coupling waveguide 106 and primary waveguide 110 in the range of 20 μm to 100 μm.

Coupling waveguide 106 may couple with a primary waveguide of a photonic integrated circuit, such as primary waveguide 110 shown in FIG. 1. Primary waveguide 110 is positioned between coupling waveguide 106 and silicon substrate 102. A portion of coupling waveguide 106 may overlap with primary waveguide 110, which may couple to one or more optical components of the PIC. Primary waveguide 110 may be positioned over a region silicon substrate 102 separate from the trench. Primary waveguide 110 may be formed of any suitable material, including silicon. Coupling of light between coupling waveguide 106 and primary waveguide may depend on a length overlap between the two waveguides. A length $L_3$ of overlap along the z-direction between coupling waveguide 106 and primary waveguide 110 may provide a distance over which the light may couple between the two waveguide. Length $L_3$ may have a suitable dimension to provide a desired level of optical coupling between coupling waveguide 106 and primary waveguide 110. Length $L_3$ may be in the range of approximately 10 um to approximately 500 um, or any value or range of values within that range. Some embodiments relate to a primary waveguide 110 that varies in a dimension substantially parallel to the direction of light propagation through primary waveguide 110. The variation in the dimension may act to confine the light to travel along primary waveguide 110. In some embodiments, primary waveguide 110 may have a taper in a lateral dimension substantially parallel to surface 118 of the trench. The dimension of the tapering may increase away from the trench. In some embodiments, primary waveguide 110 has an end that overlaps with coupling waveguide 106 and a distal end, which may not overlap with coupling waveguide 106. Primary waveguide 110 may have a lateral dimension substantially parallel to surface 118 of the trench that increases along a direction from the end that overlaps with coupling waveguide 106 and the distal end. In some embodiments, the lateral dimension substantially parallel to surface 118 of the trench increases along a direction from the end of primary waveguide 110 overlapping with coupling waveguide 106 and the distal end. An exemplary cross-sectional configuration of primary waveguide 110 is shown by the dashed lines in FIG. 2 where a dimension of primary waveguide 106 along the x-direction varies across a length in the z-direction of primary waveguide 106. It is shown in dashed lines in FIG. 2 because it is disposed below the plane of FIG. 2, as will be appreciated from FIG. 1. Primary waveguide 110 may have width $T_3$ at an end that overlaps with coupling waveguide 106 and a width $T_4$ at a distal end of primary waveguide 110. In some embodiments, a primary waveguide may have a lateral dimension substantially parallel to the surface of the trench that decreases along a direction from the end of the primary waveguide that overlaps with coupling waveguide 106 and the distal end of the primary waveguide.

A distance d between coupling waveguide 106 and primary waveguide 110 along the y-direction may provide a desired level of coupling between coupling waveguide 106 and primary waveguide 110. A layer of dielectric material positioned between coupling waveguide 106 and primary waveguide 110 may have a dimension along the y-direction of distance d. The layer may include any suitable dielectric material including silicon dioxide. Distance d may be approximately less than 2 μm. In some embodiments, the distance d between coupling waveguide 106 and primary waveguide 110 is zero and the two waveguides are in contact. A layer of material 108 may be positioned between primary waveguide 110 and silicon substrate 102. The layer of material 108 may be an oxide layer.

In some embodiments, primary waveguide 110 is offset from an edge of layer 108 that borders the trench by a distance $L_4$, which may reduce damage to the primary waveguide during formation of the trench. Distance $L_4$ may be approximately 50 nm or more along the z-direction. Having offset distance $L_4$ may be particularly beneficial when the primary waveguide is formed before etching the trench in the silicon substrate to accommodate for the level of precision in the etching process. Forming the primary waveguide at a distance $L_4$ from where the trench is to be formed may provide a level of tolerance for the etching process used to form the trench in the silicon substrate. Accordingly, distance $L_4$ may have a suitable dimension corresponding the precision level of the etching process.

Figure 3:
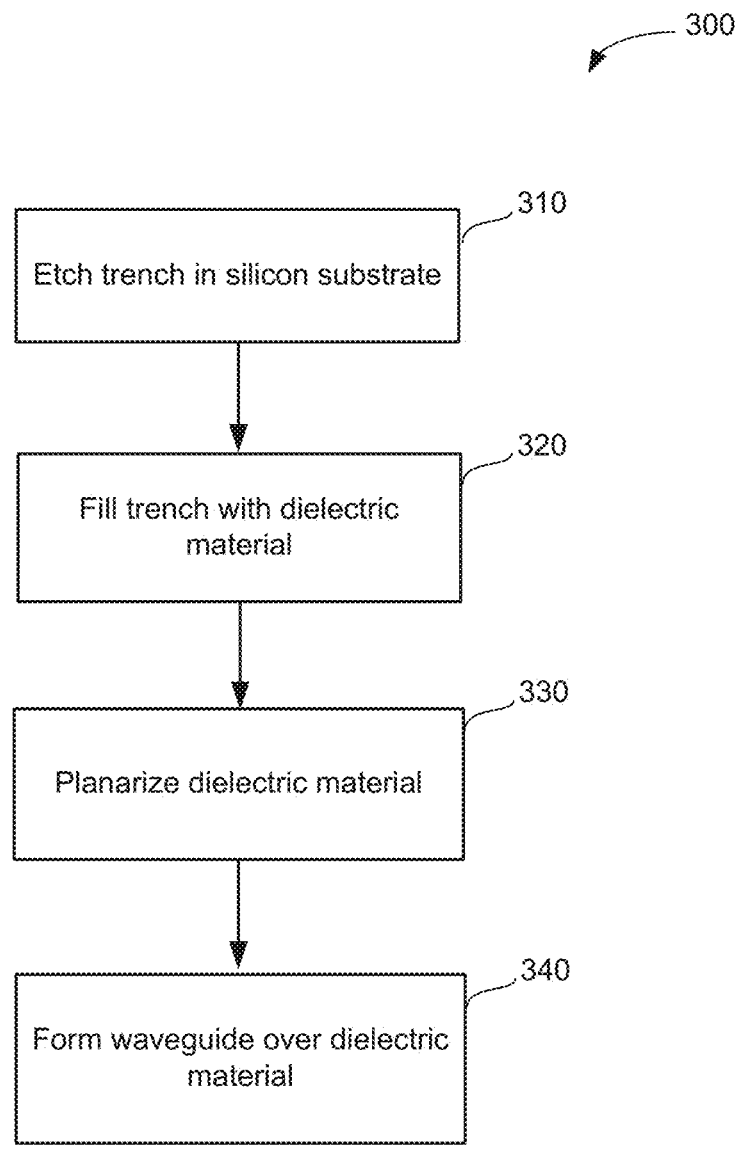
FIG. 3 is a schematic illustrating an exemplary method for forming a facet coupler according to a non-limiting embodiment.

Some embodiments of the present application relate to a method of manufacturing a facet optical coupler having a structure described herein. Any fabrication techniques suitable for silicon-based photonic integrated circuits may be used according to some embodiments. FIG. 3 shows steps of an exemplary method of manufacturing a facet optical coupler, although other suitable methods and/or additional steps may be used to form the facet optical couplers described above. Method 300 may start with a silicon substrate. Method 300 may also start after formation of the dielectric layer and/or the primary on the silicon substrate. At act 310, a portion of the silicon substrate may be removed to from a trench, such as by using a suitable etching technique. In some embodiments, act 310 may include removing a portion of the dielectric layer and/or the primary waveguide to form the trench. The trench may be formed at the wafer-level prior to the formation of individual semiconductor chips by dicing the wafer. In such embodiments, the trench may be formed by removing a portion of the silicon substrate at a region corresponding to what will become an edge of a PIC after dicing of the PIC from the wafer. In some embodiments, the portion of the silicon substrate removed may provide a trench to multiple semiconductor chips on the wafer. For example, neighboring semiconductor chips on a wafer may share an etched silicon substrate region, which upon dicing of the wafer results in each semiconductor chip having a trench.

Method 300 may proceed by filling the trench with a dielectric material by act 320. The dielectric material may act as a cladding layer. Suitable dielectric materials include silicon dioxide ($SiO_2$), as a non-limiting example. Method 300 may include planarizing the dielectric material by act 330. Planarization of the dielectric material may provide a suitable surface for the subsequent formation of a waveguide over the dielectric material by act 340. Any suitable dielectric material may be used to form the waveguide including a material having the form $Si_xO_yN_z$. Examples of such materials include silicon, silicon oxynitride (e.g., SiON), and silicon nitride (e.g., $Si_3N_4$) by way of example and not limitation. The waveguide of a PIC may be sized and shaped to couple with an optical fiber positioned at an edge of the PIC. The mode size of the waveguide may be defined by the dielectric material used to form the waveguide and one or more dimensions of the waveguide at an end of the waveguide proximate the edge. The waveguide may be sized and shaped to vary the optical mode field size along the direction of light propagation of the waveguide. Forming the waveguide of act 340 may include patterning the waveguide such that the region of the waveguide that overlaps with the trench reduces the mode field size at a distance from an end of the waveguide proximate an edge of the PIC. An end of the waveguide may terminate over the trench. The region of the waveguide overlapping with the trench may be formed to reduce the optical mode field size to a size that can propagate along the waveguide beyond the trench where loss due to the silicon substrate being at a closer distance to the waveguide is greater.

Methods consistent with method 300 may also include, subsequent to act 340, dicing a wafer to create individual photonic devices. Also, formation of a waveguide, such as primary waveguide 110 may be included in the process.

The acts of method 300 shown in FIG. 3 may be implemented at different steps during formation of a wafer having multiple PICs and individual PICs. The ease of fabrication method 300 provides flexibility in the formation of the trench and the waveguide over the trench at any suitable stage during fabrication. The waveguide formed during act 340 may act as a coupling waveguide and be configured to couple light to another waveguide of the PIC. In some embodiments, the trench and the waveguide may be formed after another waveguide of the PIC is formed. In such embodiments, removal of the trench may include removing a portion of the other waveguide in addition to the portion of the silicon substrate. In some embodiments, a wafer or individual PIC may undergo one or more metallization processes. Formation of the trench and overlaying waveguide may occur before, after or in the middle of a metallization process.

It should be appreciated that the waveguide formed over the trench can be used for functions beyond horizontal coupling. Such functions may include wavelength multiplexing and/or demultiplexing, polarization rotation, and temperature insensitive circuits.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A method of forming a facet optical coupler comprising:
   forming a trench in a silicon substrate;
   forming a first waveguide on an oxide layer overlying the silicon substrate in a region separate from the trench, wherein the first waveguide and the trench are non-overlapping;
   filling the trench with a dielectric material; and
   patterning a second waveguide on the dielectric material overlying at least part of the trench and at least part of the first waveguide.

2. The method of claim 1, wherein forming the second waveguide includes forming the second waveguide over the trench such that the second waveguide is disposed at a distance L from a first surface of the trench, wherein a first end of the second waveguide terminating over the trench has a first size and a second end of the second waveguide distal the first end has a second size different than the first size, and wherein a material of the second waveguide and the first size define a mode size of the second waveguide smaller than 2L.

3. The method of claim 2, wherein a lateral dimension of the second waveguide substantially parallel to the first surface of the trench is smaller at the first end than at the second end.

4. The method of claim 2, wherein at least a portion of the first waveguide overlaps with at least the second end of the second waveguide.

5. The method of claim 4, wherein the first waveguide is positioned between the second waveguide and the silicon substrate.

6. The method of claim 5, wherein the first waveguide and the second waveguide are separated by a layer of dielectric material.

7. The method of claim 4, wherein the first waveguide comprises a third end overlapping the second waveguide and a fourth end distal the third end, and wherein the first waveguide has a lateral dimension substantially parallel to the first surface that increases along a direction from the third end to the fourth end.

8. The method of claim 2, wherein 2L is more than approximately 3 microns.

9. The method of claim 2, wherein the material of the second waveguide and the first size define a vertical mode size of the second waveguide smaller than 2L.

10. The method of claim 1, wherein the second waveguide includes one or more of silicon, $Si_3N_4$, and SiON.

11. The method of claim 1, further comprising dicing the silicon substrate at the trench.

12. The method of claim 11, wherein the first end of the second waveguide and a side of the filled trench form a facet.

13. An apparatus comprising:
   a silicon substrate having an edge and a trench formed at the edge;
   a first waveguide formed on an oxide layer overlying the silicon substrate in a region separate from the trench;
   a dielectric material filling the trench; and
   a second waveguide formed on the dielectric material overlying at least part of the trench and at least part of the first waveguide, wherein a first end of the second waveguide and a side of the dielectric material form a facet of the apparatus.

14. The apparatus of claim 13, wherein the second waveguide is disposed at a distance L from a first surface of the trench, wherein a first end of the second waveguide proximate the facet has a first size and a second end of the second waveguide distal the first end has a second size different than the first size, and wherein a material of the second waveguide and the first size define a mode size of the waveguide smaller than 2L.

15. The apparatus of claim 14, wherein a lateral dimension of the second waveguide substantially parallel to the first surface of the trench is smaller at the first end than at the second end.

16. The apparatus of claim 14, wherein at least a portion of the first waveguide overlaps with the second end of the second waveguide.

17. The apparatus of claim 16, wherein the first waveguide is positioned between the second waveguide and the silicon substrate.

18. The apparatus of claim 17, wherein the first waveguide and the second waveguide are separated by a layer of dielectric material.

19. The apparatus of claim 14, wherein the first waveguide comprises a third end overlapping the second waveguide and a fourth end distal the third end, and wherein the first waveguide has a lateral dimension substantially parallel to the first surface that increases along a direction from the third end to the fourth end.

20. The apparatus of claim 14, wherein 2L is more than approximately 3 microns.

21. The apparatus of claim 14, wherein the material of the second waveguide and the first size define a vertical mode size of the second waveguide smaller than 2L.

22. The apparatus of claim 13, wherein the second waveguide includes one or more of silicon, $Si_3N_4$, and SiON.

23. The apparatus of claim 13, wherein the first waveguide and the trench are non-overlapping.

* * * * *